(No Model.)

R. CLARKE.
MANUFACTURE OF PLUMBERS' TRAPS.

No. 399,243. Patented Mar. 12, 1889.

Witnesses.
Jno. G. Hinkel Jr.
H. S. McArthur

Inventor,
Robert Clarke
By Foster & Freeman
Attorneys.

UNITED STATES PATENT OFFICE.

ROBERT CLARKE, OF GRAVESEND, NEW YORK.

MANUFACTURE OF PLUMBERS' TRAPS.

SPECIFICATION forming part of Letters Patent No. 399,243, dated March 12, 1889.

Application filed October 12, 1888. Serial No. 287,909. (No model.)

*To all whom it may concern:*

Be it known that I, ROBERT CLARKE, a citizen of the United States, residing at Gravesend, Kings county, New York, have invented certain new and useful Improvements in the Manufacture of Plumbers' Traps, of which the following is a specification.

My invention relates to plumbers' traps; and it consists of a trap having a body composed practically of one piece of soft metal contracted and closed by a cap at one end, and with a bottom forming part of the body and provided with inlet and outlet pipes, and in the mode hereinafter set forth of making such traps.

Figure 1:
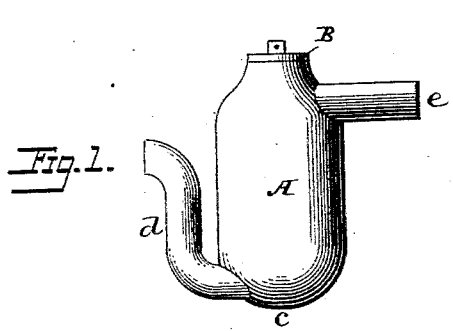
Figure 2:
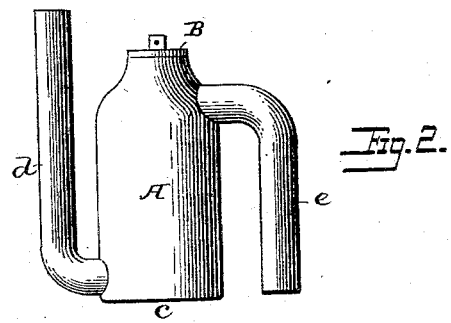
Figure 3:
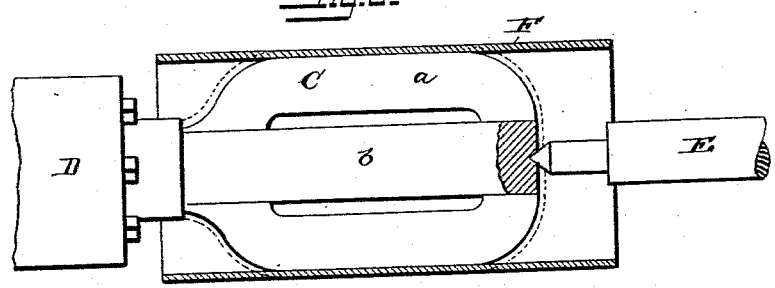
Figure 4:
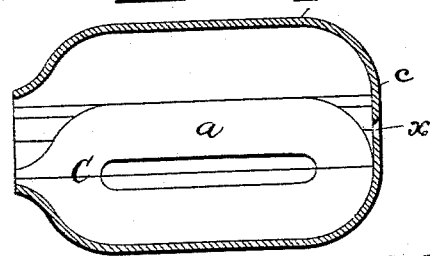
Figure 6:
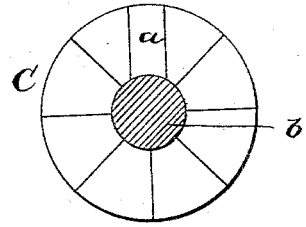
Figure 5:
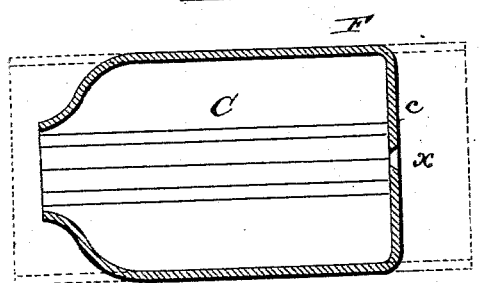

In the accompanying drawings, Figures 1 and 2 are exterior views showing different forms in which my improved trap may be made. Fig. 3 is a longitudinal section illustrating the form of mandrel upon which the trap-body is spun and the method of forming the same. Fig. 4 is a sectional view showing the body spun upon the mandrel with the key in the act of being detached. Fig. 5 illustrates the form of mandrel employed in making a body with a flat bottom. Fig. 6 is an end view of the mandrel, the core in section.

The form of the trap to which my invention more particularly relates is illustrated in Figs. 1 and 2, the said trap having a body, A, contracted at one end, to which is adapted a detachable cap, B, and closed at the opposite end, which may be rounded, as shown in Fig. 1, or flat, as shown in Fig. 2.

In order to avoid the necessity of making the body and closed end of two pieces of metal soldered together along their meeting edges, and to secure the advantages resulting from a body consisting of one continuous piece of metal, I construct the trap in a manner which I will now proceed to describe, making use of a sectional mandrel somewhat similar in character to that illustrated in Letters Patent granted to me September 25, 1883, No. 285,574. The said mandrel or former C is mounted between the head-stock D and tail-stock E of a lathe, and a lead tube, F, is placed upon the former and is spun down upon the contracted end of the former from the position shown in full lines, Fig. 3, to the position shown in dotted lines, thereby forming the contracted end of the trap-body. The opposite end of the former or mandrel, instead of tapering to a smaller neck, like the other end, as in the mandrel referred to, and shown in my said patent, is rounded, as shown in Fig. 3, or flat, as shown in Fig. 5, to correspond to the form of the end of the trap-body, and the end of the tube F projecting beyond this portion of the mandrel is spun down, so as to completely cover the said end, with the exception of that portion immediately opposite the point of the tail-stock, thus forming the bottom and side in one piece. The key-section a of the former is held in its position by the core b, and when the latter is withdrawn the key-section is moved down to the position shown in Fig. 4 and drawn out of the body through the contracted open end, after which the other sections are withdrawn in succession. The hollow body of one continuous piece of lead is thus formed with a contracted neck at one end and with a bottom, c, in one piece with the other portions of the body, closed with the exception of a small opening, x, at the center, and this opening is filled or plugged by means of solder, or by burning or by welding to the bottom portion a piece or plug of soft metal, thereby forming a practically-continuous body with a closed bottom in one piece. Suitable openings are now made in the sides of the body, and pipes are connected to the body to form the inlet-pipe d and the outlet-pipe e, communicating with the body through said openings.

By constructing the trap in the manner above described I avoid the necessity of soldering caps, covers, or bottom pieces in the body of the cap, for the purpose of closing the same at one end, the trap is stronger and more durable and less likely to leak, it can be more cheaply made than those of the ordinary construction, and may be produced without the employment of skilled labor.

Without limiting myself to the precise construction and arrangement of parts shown, I claim—

1. As a new article of manufacture, a plumber's trap having a body contracted at one end to form a neck provided with a cap, B, and at the other end to form the bottom in one piece with the body, with a central closing-plug at the bottom and with inlet and outlet pipes, substantially as set forth.

2. The within-described improvement in the manufacture of plumbers' traps, the same consisting in spinning down one end of a soft-metal tube to form the contracted neck of a trap-body, in spinning down the other end and forming a bottom in one piece with the body to close such end, with the exception of a central opening, and then plugging said opening, substantially as set forth.

In testimony whereof I have signed my name to this specification in the presence of two subscribing witnesses.

ROBERT CLARKE.

Witnesses:
CHAPLIN MOORHEAD,
JOHN MCMULLAN.